United States Patent [19]

Rogers et al.

[11] Patent Number: 4,902,301
[45] Date of Patent: Feb. 20, 1990

[54] PROCESS FOR SHIPMENT OF SODIUM CYANIDE SLURRIES

[75] Inventors: Janet M. Rogers, Cordova, Tenn.; Harold F. Porter, Hockessin, Del.

[73] Assignee: E. I. Du Pont de Nemours and Company, Wilmington, Del.

[21] Appl. No.: 186,043

[22] Filed: Apr. 25, 1988

[51] Int. Cl.[4] .............................. C01D 1/30; C01C 3/08
[52] U.S. Cl. ................................. 23/302 T; 23/293 R; 23/302 R; 423/371
[58] Field of Search ......... 423/371; 23/293 R, 302 T, 23/306, 303, 302 R

[56] References Cited

U.S. PATENT DOCUMENTS

| | | | |
|---|---|---|---|
| 1,311,232 | 7/1919 | Jacobs | 423/371 |
| 1,531,123 | 3/1925 | Mittasch et al. | |
| 1,591,630 | 7/1926 | Jacobs | 423/371 |
| 1,921,299 | 9/1933 | Migrdichian | 423/371 |
| 2,215,183 | 9/1940 | Lawrence et al. | 423/556 |
| 2,332,242 | 10/1943 | MacMullin | 23/293 |
| 2,616,782 | 11/1952 | Cain | 23/79 |
| 2,708,151 | 6/1953 | McMinn, Jr. | 23/79 |
| 2,726,139 | 5/1953 | Oliver | 23/79 |
| 2,773,752 | 12/1956 | Kremer et al. | 423/371 |
| 3,287,085 | 11/1966 | Jenks et al. | 423/371 |
| 3,619,132 | 11/1971 | Mann et al. | 23/79 |

Primary Examiner—Gary P. Straub
Attorney, Agent, or Firm—Charles E. Krukiel

[57] ABSTRACT

A process for manufacturing, shipping and unloading substantially solid, ice-like sodium cyanide dihydrate containing essentially no liquid water. A slurry of 58 weight percent or higher sodium cyanide is rapidly cooled to the anhydrous/dihydrate transition temperature while minimizing the settling out of sodium cyanide crystals to form the product in a container. Dissolution prior to unloading is by adding heat and water or dilute sodium cyanide solution.

6 Claims, 2 Drawing Sheets

4,902,301

PROCESS FOR SHIPMENT OF SODIUM CYANIDE SLURRIES

FIELD OF INVENTION

This invention relates to a process for manufacturing and shipping of sodium cyanide dihydrate.

BACKGROUND

Sodium cyanide is typically produced by reacting hydrogen cyanide with aqueous caustic soda, followed by evaporative crystallization to produce a slurry of sodium cyanide crystals. The sodium cyanide crystals are separated from the slurry, dried and usually formed by dry compression methods into briquets. The resulting briquets are about 99 weight percent anhydrous sodium cyanide.

The briquets are shipped to consumers generally in containers designed to exclude exposure to atmospheric air since the anhydrous sodium cyanide is very hygroscopic and can absorb substantial quantities of water when exposed to atmospheric air. If exposed to atmospheric air, serious difficulties in shipping and storage can result due to caking. Also, there is the added cost of excluding atmospheric air.

The majority of the consumers of this product prefer to feed the sodium cyanide into their processes in the form of an aqueous solution. They dissolve the sodium cyanide, often after breaking the briquets into smaller particles, to produce a solution containing about 20 to 25 weight percent sodium cyanide. To avoid hydrolysis with the resulting evolution of hazardous hydrogen cyanide vapors, an alkali such as sodium hydroxide is added to the dilution water. Sufficient alkali should be added to raise the resulting solution pH to above 12.

To avoid difficulties and cost associated with storage of the anhydrous product and industrial hygiene hazards due to generation of respirable dust when handling anhydrous sodium cyanide or breaking it into smaller particles, some of the larger consumers have changed to direct solution storage. This has been accomplished by dissolution of the briquets in the shipping container, usually tank trucks or railway cars, and unloading the resulting solution into storage tanks.

These shipping processes have the disadvantages of added investment and operating cost associated with concentrating, separating, drying and compacting anhydrous sodium cyanide only to dissolve and dilute it prior to use. It would thus appear that since the consumer uses dilute solutions, direct shipment of solution particularly where the sodium cyanide production facilities are located in reasonable proximity of the consumer would be appropriate. However, the shipment of liquid presents an unacceptable environmental risk of spills in the event of an accident during transportation.

The present invention eliminates the need to separate, dry and compact the sodium cyanide prior to shipment, yet it produces a solid product which is desired for safe handling. The sodium cyanide concentration is high enough that the cost of shipping water does not become an overriding concern. Also, consumers do not have dust hazards associated with handling the anhydrous sodium cyanide and do not have to add caustic to avoid hydrolysis.

The process comprises conversion of a slurry of specified maximum water content to a substantially solid ice-like hydrate of sodium cyanide, $NaCN.2H_2O$, or a mixture of anhydrous and dihydrate sodium cyanide.

On arrival at the consumer's plant, the solidified product is delivered to the consumer's solution storage by addition of water and heat.

SUMMARY OF INVENTION

It has been found that slurries containing more than 58 weight percent (wt %), preferably 60 to 65 wt % sodium cyanide (30 to 40% solid crystals), can be rapidly cooled to below the anhydrous/dihydrate transition temperature while minimizing the settling out of sodium cyanide to form an substantially solid, ice-like sodium cyanide dihydrate product. Such slurries can be pumped and injected at about 40° to 60° C. into an evacuated shipping container, under which conditions, flash cooling to a temperature near the anhydrous/dihydrate transition temperature, followed by somewhat slower cooling at more or less constant temperature takes place while dihydrate crystallizes from solution to form an ice-like substantially solid product and the latent heat of crystallization is released with water vapor. When a 60 to 65 wt % slurry is solidified by evaporative cooling, the product will contain approximately 65 to 80 wt % dihydrate and 15 to 30 wt % anhydrous crystals plus a small amount of liquid which contains the bulk of the impurities and which is dispersed in the interstices of the crystals. Preferably there should be no more than 5wt % liquid. The product as loaded will contain about 65 to 70 wt % sodium cyanide.

DETAILED DESCRIPTION

Sodium cyanide can be made by any process known in the art. For example, see U.S. Pat. No. 2,708,151 to McMinn, Jr. and U.S. Pat. No. 2,726,139 to Oliver, both of which teach reacting substantially pure HCN with substantially pure NaOH. Also, see U.S. Pat. Nos. 3,619,132 to Mann et al., 2,616,782 to Cain, 1,531,123 to Mittasch et al. and recently filed patent application Ser. No. 07/110,731 to Rogers et al., assigned to E. I. du Pont de Nemours & Company, Inc., for processes employing impure starting materials. These five patents and one patent application are incorporated herein by reference.

For the present invention, however, the sodium cyanide crystals are not isolated from the reaction solution. Instead, they should be concentrated by any of a number standard procedures known to those skilled in the art for concentration of slurries. Such methods include evaporation, sedimentation and filtration. The concentrated slurry preferably should be greater than 58 wt % sodium cyanide (26 percent solid crystals) and, more preferably should be from about 60 to 65 wt % sodium cyanide (30 to 40 percent solid crystals). The concentrated slurry should contain from about 1 to 5 wt % of a base such as sodium hydroxide or sodium carbonate, as the case may be. Preferably the concentration of base should be about 1.5 wt %. Preferably the base is sodium hydroxide.

Solidification of the concentrated slurry is accomplished by cooling to below the anhydrous/dihydrated transition temperature while minimizing the setting out of sodium cyanide crystals. For example, solidification is accomplished by injecting the concentrated slurry into a shipping container at a temperature and pressure that will cause a portion of the water in the solution to flash off resulting in a rapid temperature drop to a point where sodium cyanide dihydrate forms. This flash cooling process prevents the settling out of sodium cyanide crystals prior to formation of the hydrated sodium cyanide. The injection temperature preferably is about 40° to 70° C. and more preferably about 50° C. The pressure in the shipping container preferably should be about 8 to 16 millimeters mercury (mm Hg) and more preferably 10 mm Hg.

Preferably the slurry is injected through a plurality of nozzles in the shipping container at a nozzle velocity of 10 to 20 feet per second. At such velocity and at a temperature less than about 60° C., entrainment of the sodium cyanide slurry into the vacuum system is minimized.

As the water from the liquid portion of the slurry is flashed off, dihydrate crystallizes from solution and the latent heat of crystallization is removed in the form of water vapor.

Other cooling methods that achieve rapid cooling to below the transition temperature point for anhydrous/dihydrated sodium cyanide and assure that the sodium cyanide crystals do not settle out inhibiting the mass transfer to dihydrate are within the equivalents envisioned by this invention. Typically, however, water-cooled cooling coils are not practical because the coils foul quickly and a large coil area is required and stirring the slurry to prevent settling is impractical because of high viscosity.

Slurries containing greater than 58 wt % and more preferably 60 to 65 wt % sodium cyanide can be easily pumped, evaporated and otherwise processed satisfactorily. When a 58 wt % slurry is solidified by evaporative cooling, the final product will contain approximately 80 to 82 wt % dihydrate and about 15 wt % anhydrous crystals plus about 3 to 5 wt % liquid, which contains the bulk of the impurities and which is dispersed in the interstices of the crystals. The product as loaded will contain about 65 wt % sodium cyanide.

When a 60 to 65 wt % slurry is solidified by evaporative cooling, the final product will contain approximately 65 to 80 wt % dihydrate and 15 to 30 wt % anhydrous crystals plus a small amount of liquid (1 to 5 wt %) which contains the bulk of the impurities and which is dispersed in the interstices of the crystals. The product as loaded will contain about 65 to 70 wt % sodium cyanide.

Since aqueous sodium cyanide solutions suffer hydrolysis according to the reaction,

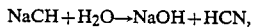

$NaCH + H_2O \rightarrow NaOH + HCN$, it is necessary to add an alkali such as sodium hydroxide or sodium carbonate to maintain the solution pH above 12 to prevent evolution of HCN vapors. Since the starting sodium cyanide is not separated from the reaction solution, sodium hydroxide or sodium carbonate, as the case may be, is present throughout the process and in the final solidified product in a range of 1 to 4 wt %, preferably 1.5 wt %.

A 20 to 35 wt % sodium cyanide solution containing 0.5 to 2 wt % sodium hydroxide can be made at the consumer's facility by heating the shipping container to a sufficiently high temperature and by circulating dilution water or dilute sodium cyanide solution through the shipping container to the storage tank. The temperature should be greater than 40° C. and, preferably should be from about 60° to 80° C. Preferably the circulating dilution water is injected into the shipping container at high velocity and impinges on the surface of the solid product.

FIGURES

A more complete understanding of the present invention may be had by referring to the Figures.

Figure 1:
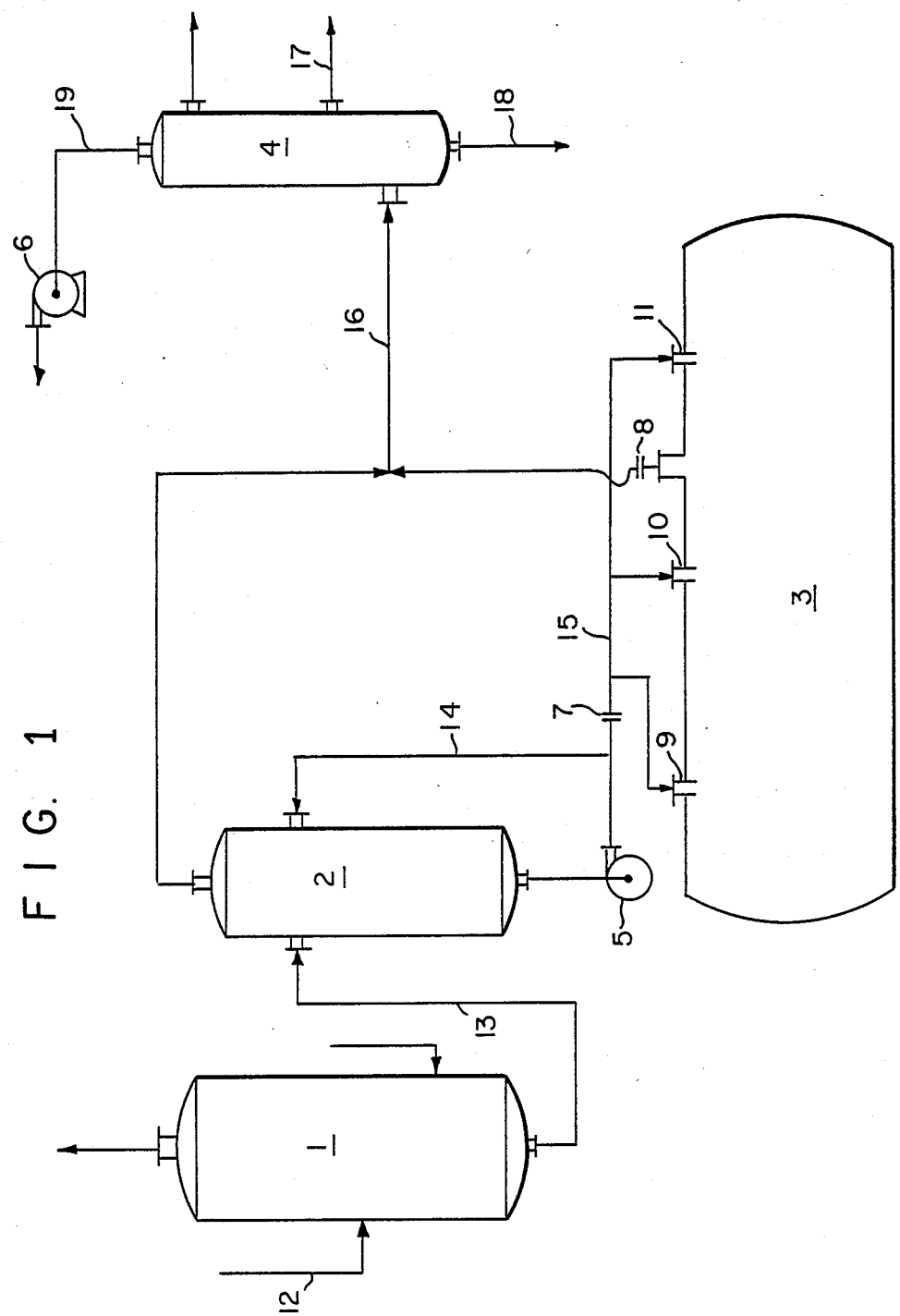
FIG. 1 depicts a preferred mode of Operation for loading shipping containers.

In FIG. 1, production slurry received from a sodium cyanide manufacturing facility is fed through line 12 to Slurry Concentrator 1, which further concentrates production slurry and then through line 13 to Slurry Cooler 2, an evaporative cooler operating at 40° to 60° C. Pump 5 continuously recirculates cool slurry through line 14. A Shipping Container 3 is connected to the slurry cooler by quick connectors 7 and 8. Shipping Container 3 is evacuated to a pressure of 10 to 15 mm of mercury by Vacuum Pump 6. Water vapor from flash cooling in Shipping Container 3 and from Evaporative Cooler 2 enters Refrigerated Condenser 4 through line 16. Condenser 4 receives refrigerant through line 17, and condensed water is discharged through line 18. Non-condensable gases pass through line 19 to Vacuum Pump 6.

When charging Shipping Container 3, slurry is introduced by way of line 15 through nozzles 9, 10 and 11. The slurry rapidly flashes to the dihydrate transition temperature by dissipation of its sensible heat, after which vaporization continues at a slower rate as the latent heat of conversion of anhydrous to dihydrate and direct crystallization of dihydrate from solution is released as water vapor. The net result is deposition of an ice-like substantially solid crystal mass with essentially no free liquid. The mass builds on itself until the Shipping Container is filled. With entrance nozzle velocity of 10 to 20 feet per second in nozzles 9, 10 and 11, there should be little or no slurry entrainment in the vacuum system particularly at slurry feed temperatures of less than 60° C.

Figure 2:
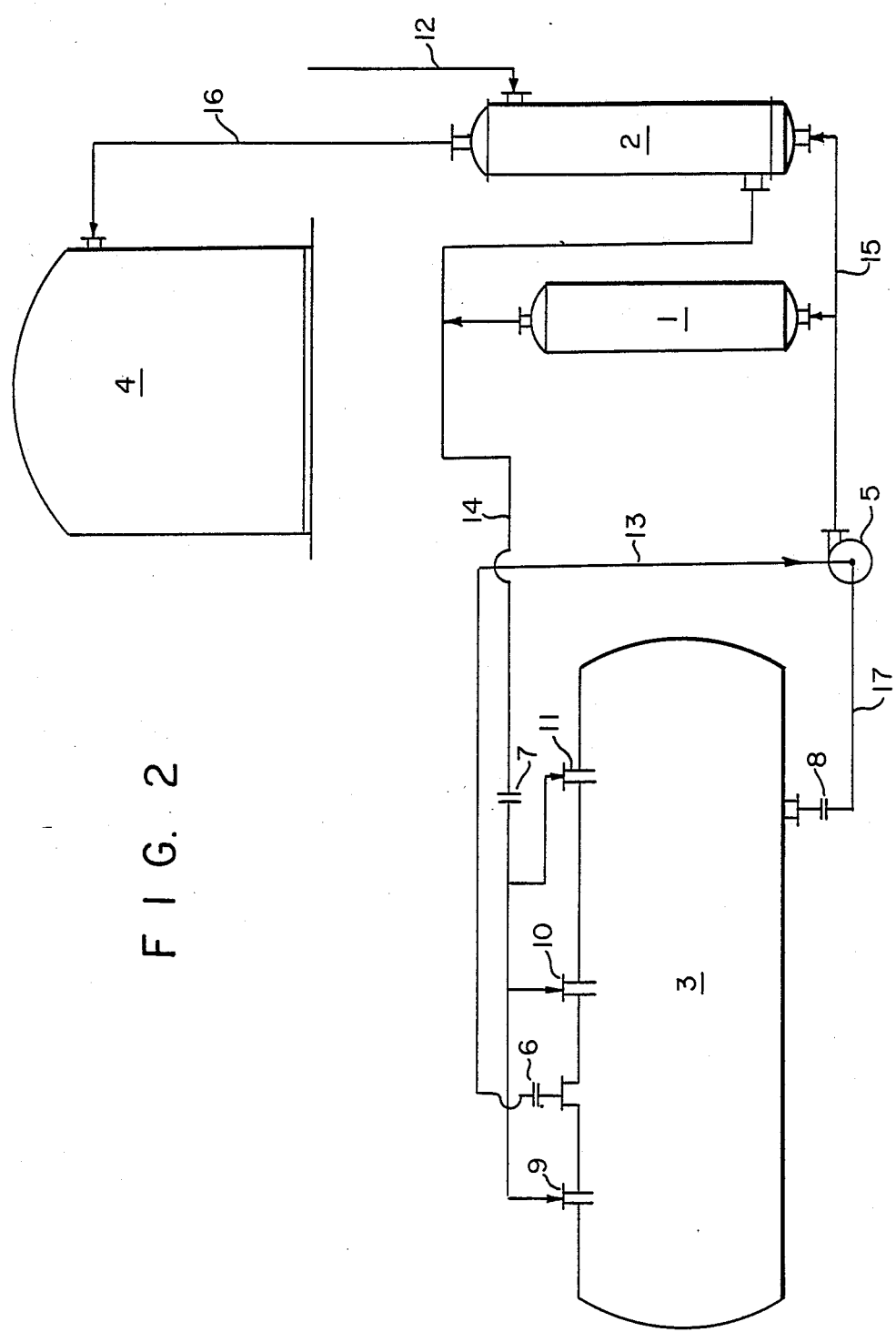
FIG. 2 depicts a preferred mode of operation for unloading shipping containers.

FIG. 2 illustrates a preferred method of unloading the Shipping Container. Shipping Container 3 is connected to the unloading facilities by quick connectors 6, 7 and 8. Dilution water enters through line 12 until the system is essentially full. The completely filled system recirculates liquid through line 13 to Circulating Pump 5 and through Heater 1 with return to the Shipping Container 3 through line 14. Dilute solution (usually about 20 to 25 wt % sodium cyanide) can optionally be passed to Heat Exchanger 2 through line 15 and finally to Storage Tank 4 through line 16. Heat Exchanger 2 preheats the dilution water while at the same time cooling the dilute solution prior to storage thereby improving economy of operation.

The recirculating dissolution solution entering nozzles 9, 10 and 11 at high velocity serves to create top to bottom circulation in the Shipping Container, thereby accelerating dissolution of solids. On completion of dissolution of the solid phases, line 17 may be used to completely empty the Shipping Container prior to returning it to the supplier.

Other modes of delivery of solution to consumer's storage may be practiced in accordance with the facilities available. For example, the consumer's tank 4 may be charged with the required quantity of hot water before beginning delivery, thereby eliminating the in-line heater and heat exchanger. Also, the sodium cyanide dihydrate can be heated until it becomes liquid and then water or dilute sodium cyanide solution can be added.

EXAMPLES

The following examples are intended to illustrate and not limit the invention. Unless otherwise indicated, all percentages are by weight.

EXAMPLE OF EVAPORATIVE SLURRY COOLING

A laboratory vessel was evacuated to a pressure of 12 mm of mercury absolute pressure, and maintained at or near this pressure while feeding 65% NaCN slurry containing 1.7% NAOH and at temperature of 50° C. An ice-like solid sodium cyanide dihydrate was built from the bottom of the flask, with no visible liquid remaining after the solidified slurry cooled to a final temperature of 20° C. After several days standing at room temperature, a very small quantity of liquid was visible on the surface. Composition of this liquid was 35% NaCN, 5 to 6% NaOH, 0.2% $Na_2CO_3$, and 3% NaCOOH.

EXAMPLE OF DIHYDRATE DISSOLUTION

Ten pounds of ice-like dihydrate was placed in a laboratory flask equipped with a top vertical inlet nozzle and a horizontal outlet near the top. Dilute sodium cyanide solution maintained at 60° C. was circulated through thr vertical nozzle at a nozzle velocity of 20 feet per second, and a flow rate of 1.2 gallons per minute. Under these conditions, the ice-like solid was completely dissolved in less than 40 minutes, producing a 25% sodium cyanide solution.

A second experiment was run, starting with the quantity of water, heated to 80° C., required to produce a 25% solution. No additional heat was added during the dissolution cycle. The solid was completely dissolved in less than 60 minutes with a final temperature of 40° C.

We claim:

1. A process for preparing sodium cyanide for shipment comprising, (a) forming a slurry of sodium cyanide crystals to be shipped which has a concentration greater than 58 wt. % total sodium cyanide at a temperature above about 35° C. and contains from about 1 to 5 wt. % of a base selected from sodium hydroxide or sodium carbonate, and (b) evaporatively cooling the slurry in a shipping container while minimizing the settling out of said crystals to a temperature below the anhydrous/dihydrated transition temperature to form a sodium cyanide dihydrate product having no more than about 5 wt. % liquid.

2. The process of claim 1 wherein the slurry of sodium cyanide crystals to be shipped is cooled by injecting it into a shipping container at a pressure of from 8 to 16 mm Hg.

3. The process of claim 2 wherein the injection temperature is about 40° to 80° C., and the shipping container pressure is about 8 to 16 millimeters mercury absolute.

4. The process of claim 2 wherein the injected slurry is at a concentration of 60 to 65% sodium cyanide with the injection temperature between 50° and 60° C.

5. A process for shipping sodium cyanide which comprises:
    (a) forming a slurry of sodium cyanide crystals at a temperature of from about 40° to about 70° C. which has a concentration of at least about 58 wt. % total sodium cyanide and from about 1 to 5 wt. % of a base;
    (b) evaporatively cooling the slurry in a shipping container to a temperature below the anhydrous/dihydrated transition temperature to form a substantially solid sodium cyanide dihydrate having no more than about 5 wt. % liquid; and
    (c) shipping the dihydrate.

6. The process of claim 5 wherein the base is selected from sodium hydroxide or sodium carbonate and the slurry is cooled by injecting it into a shipping container at a pressure of from 8 to 16 mm Hg.

* * * * *